United States Patent [19]

Betterton et al.

[11] Patent Number: 4,807,478
[45] Date of Patent: Feb. 28, 1989

[54] PRESSURE TRANSDUCER

[75] Inventors: Joseph T. Betterton, Arab; Alfred H. Glover, Decatur; Thomas S. McKee, Madison, all of Ala.

[73] Assignee: Chrysler Motors Corporation, Highland Park, Mich.

[21] Appl. No.: 116,439

[22] Filed: Nov. 3, 1987

[51] Int. Cl.⁴ .................... G01L 7/08; G01L 9/02
[52] U.S. Cl. .................................. 73/725; 338/42
[58] Field of Search ............. 73/725, 719, 746, 744, 73/146.8, 715; 338/42, 39

[56] References Cited

U.S. PATENT DOCUMENTS

| | | | |
|---|---|---|---|
| 2,877,327 | 3/1959 | Hastings | 73/725 |
| 3,283,584 | 11/1966 | Coffing | 73/744 |
| 4,103,549 | 8/1978 | Schmidt | 73/146.8 |

*Primary Examiner*—Donald O. Woodiel
*Attorney, Agent, or Firm*—Kenneth H. MacLean, Jr.

[57] ABSTRACT

A fluid pressure transducer with an efficient mechanism to transform linear movements of a diaphragm mid portion, for example, into rotative movements of an electrical contact assembly which is slidably interactive with a resistive circuit board means.

2 Claims, 1 Drawing Sheet

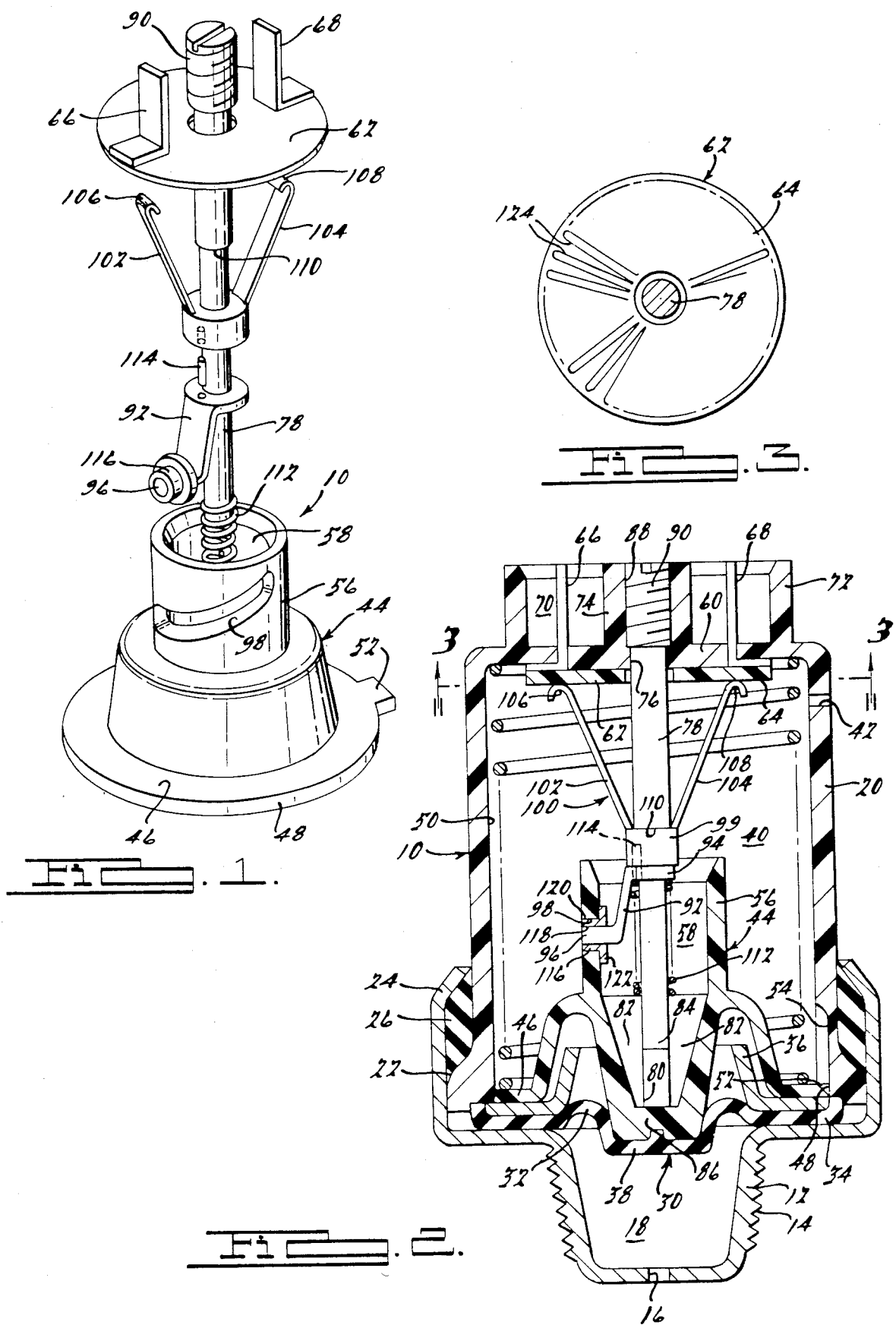

PRESSURE TRANSDUCER

BACKGROUND OF THE INVENTION

There are many applications for fluid pressure transducers. The transducer is particularly useful in automobiles for measuring and indicating the pressure of lubricating oil in an internal combustion engine. It is desirable to utilize a simple yet reliable transducer which transforms linear movements into rotary movements. Linear movements are typically produced by the effects of pressurized fluid on the mid portion of a flexible diaphragm. Desired rotary motion is particularly useful for moving electrical contacts or the like across a resistance pattern or grid formed on a resistance board. Thus, the transducer must transform the linear movement to rotary movement. Resultantly, the transducer produces an electrical indication or signal which is proportional to the movement of the diaphragm caused by the effects of fluid pressure.

An early pressure indicator or transducer is disclosed in U.S. Pat. No. 1,171,480 to Troll. In the Troll patent, a member attached to a diaphragm moves linearly and its movements are transformed to rotary movement by means of a rather complex lever and gear arrangement. Another early pressure transducer is disclosed in U.S. Pat. No. 2,877,327 to Hastings. The Hastings device utilizes a movable diaphragm responsive to the effects of fluid pressures. The diaphragm includes a central assembly which is linearly movable with the diaphragm. The central assembly defines an axial directed aperture. A elongated member or pin which has a spiral channel formed therein moves in the aperture. Rotary movement is produced by means of a follower which extends into the spiral channel. Likewise, U.S. Pat. No. 4,086,557 to Padgitt discloses a transducer utilizing a member with a sprial channel which is interactive with a stationary structure.

Another relevant patent which is known to applicant is U.S. Pat. No. 2,943,302. None of the aforementioned patents utilized or disclose the transducer structure of the subject device which is specifically described and claimed hereinafter.

SUMMARY OF THE INVENTION

The pressure transducer of this application includes a mechanism to directly transmit linear movements of one member into rotary movements of another member. Specifically, a force is produced on one side surface of a diaphragm which is exposed to oil pressure of an engine lubricating system. This produces movements of the mid portion of the diaphragm corresponding to fluid pressures. A follower member connected to the mid portion of the diaphragm moves therewith in a substantially linear manner. The follower member is supported within the interior of a transducer housing so that it can not rotate. A contact carrying member is supported in the housing so that it can only rotate. The rotary movement causes the contacts to sweep along a resistance grid of a board. The resistance pattern or grid is laid out in a substantially circular pattern so that rotation of the contacts sweeps across the resistance grid from one point to another. The transformation of the linear movement of the diaphragm to the rotary movement of the contract carrying member is through the interaction between a helically extending or spiral channel in a cylindrical portion of the follower member which is attached to the diaphragm and an arm portion of the contact carrying member which extends into the channel. Further, the end of the arm supports a friction reducing roller member. The resultant movement of the arm in the helical channel causes rotation of the contact carrying member and movement of the contents progressively along the resistance board.

From the foregoing general description, it can be readily understood that the subject transducer is a relatively simple yet reliable device. Further advantages can be appreciated by a reading of the following detailed description of a preferred embodiment of the transducer as shown in the drawings which are described as follows:

IN THE DRAWINGS

FIG. 1 is a perspective view of the operative parts of the pressure transducer; and FIG. 2 is a elevational sectioned view of the transducer including the housing members; and FIG. 3 is a sectional view of the resistance board taken along section line 3—3 in FIG. 2 and looking in the direction of the arrows.

DETAILED DESCRIPTION OF AN EMBODIMENT

In the drawing, a pressure transducer 10 for measuring and indicating oil pressure is shown. The transducer 10 includes a generally hollow base or mounting member 12. Base 12 has a lower generally cylindrical portion 14 which is threaded to mountingly engage a similarly threaded aperture in an engine structure. An opening 16 is formed in the end of the member 12 for the purpose of allowing pressurized oil from an engine lubrication passage to enter the interior space 18 of the base 12.

The base 12 is attached to and thus supports a generally hollow upper housing 20 which has a lower edge portion 22 thereon which engaging the base 12. Specifically, the upper housing is attached to the lower base 12 by turning the edge portion 24 of base 12 over and around the edge portion 22. An annually shaped sealer member 26 is captured between the edge portions 22 and 24. It is sufficiently resiliency to preform a good sealing function edges 22 and 24.

A diaphragm assembly 30 is mounted between the two housings 12 and 20. The diaphragm assembly 30 includes a flexible diaphragm 32 having an outer peripheral edge portion 34 secured against the base member 12 by an annularly shaped backup member 36. This mounting allows the diaphragm's mid portion 38 to move a limited distance in an axial direction with respect to the housing 20 in response to pressure forces generated on one side of the diaphragm by pressurized fluid in interior space 18. The other side of the diaphragm is exposed to atmospheric pressure introduced to the interior 40 of the housing through a bleed aperture 42.

The upper surface of the diaphragm's mid portion 38 contacts and is secured to a movable piston member 44 which extends into the interior 40. Piston member 44 includes a depending and outwardly extending edge portion 46 with an outer peripheral edge surface 48 which slidingly engages the interior wall 50 of housing 20. A radially extending tab portion 52 of edge 46 extends into an axially extending channel 54 of housing 20. The tab 52 prohibits rotation of the piston 44 but permits axially directed movements of piston 44. Upward movements of the piston 44 are yieldably resisted by a compression type and coil configured spring 55 within housing 20.

The piston 44 has a tubular central portion 56 defining a cylinder with a relatively thin wall. The thin walled cylinder defines an interior space 58.

Housing member 20 is covered by an end portion 60 which completes the enclosure of interior 40. As can be seen in FIG. 2, the end portion supports a resistance board 62 which has a downwardly facing contact surface 64. The surface 64 carries a resistance grid formed in a circular or arcuate pattern best shown in FIG. 3. A pair of terminals 66 and 68 extend through the end portion 60 and are connected to opposite ends of the resistance grid of board 64. The terminals also extend from the upper surface of the end portion 60 to the exterior of the transducer 10. The terminal's external portions extend into an annularly configured channel 70 formed by an encircling walled portion 72 of housing 20. This structure protects the external portions of the terminals.

The end portion 60 also includes a central thickened portion 74 having an aperture 76 therethrough adapted to support an elongated cylindrical pin member 78. The pin 78 extends through the end 60 and axially through housing 20 into an aperture 80 of piston 44. The aperture 80 is generally defined by a number of webs or ribs 82 of piston 56. The lower end 84 of the pin 78 terminates above the bottom 86 of aperture 80 in member 44 to allow axially directed movements of the diaphragm assembly 30 including piston 44.

The pin member 78 is attached to the end portion 60 by an axially adjustable threaded engagement. Specifically, the central portion 74 of end 60 has a threaded aperture 88 therethrough. A similarly threaded upper end portion 90 of member 78 engages the aperture 88. In addition to supporting the pin 78 in housing 20, the threaded connection permits member 78 to be accurately moved within the interior 40 for calibration of the transducer.

For transforming linear movements of the diaphragm portion 38 and piston 44 into rotary movements about the downward facing surface 64 of resistance board 62, a rotary drive follower 92 is supported about the member 78. Specifically, drive follower 92 has a central apertured portion 94 which is free to rotate about the axis of member 78 and an arm portion 96 with a cylindrically configured outer end. The drive follower is rotated in response to movements of the arm portion 96 substantially in a circumferential direction. These movements of arm 96 are produced by a sliding contact of the cylindrically formed end of arm 96 in and along a helically or spirally configured channel means 98 in the cylinder 56 of member 44.

The central portion 94 of the drive follower 92 is positioned adjacent a similarly configured central portion 99 of a contact carrying assembly 100. The assembly 100 includes a pair of upwardly extending contact arms 102 and 104 which also extend slightly in the radially outward direction. The upper ends 106, 108 of arms 102, 104 are formed into a hook configuration as seen in FIG. 1 and 2. This presents small upper contact surfaces which are adapted to slide along the surface 64 of resistance board 62. The configuration of arms 102 and 104 provides aesired adaptability to the bearing and sliding function which occurs between the members 102, 104 and 62 and which accommodates spacing variations therebetween by resultant radial movements of end portions 106 and 108 in respect to the board 62. The central portions 94 and 98 of members 92, 100 are prevented from moving axially upward along pin support 78 by a shoulder portion 110 formed therein. Likewise, downward movements of the central portions 94 and 98 are restrained by a compression type coil spring 112 which extends between the portion 94 and the member 44. Thus the members 92 and 100 are axially restrained but may rotate about the member 78.

The drive follower 92 is rotated by interaction between its end 96 and channel 98 of cylinder 56. The resultant rotations of drive follower 92 are transmitted to the contact carrying member 100. For this purpose, central portions 94 and 98 are connected for simultaneous rotation together by a pin member 114 best shown in FIG. 1. The pin member 114 extends into aligned apertures in both of portions 94 and 98.

Functionally, changes in the fluid pressure in chamber 18 moves the diaphragm assembly 30 and piston 44. Pressure increases cause movement upward in the Housing 20. The upward movement produces both axially and circumferentially directed force components on the arm end 96. As the member 92 is axially restrained, the arm end 96 moves in the spiral channel 98 and resultantly the member 92 and 100 are rotated. To provide a smooth transformation of movements and to improve reliability, the cylindrical end 96 of the drive follower 92 supports a cylindrically configured roller 116. The roller 116 has an inner diameter surface 118 which engages the end 96 and an outer diameter surface 120 which engages the surface of the helical or spiral channel 98. The roller 116 also has an enlarged diameter end portion 122 to maintain it in the channel 98.

When the pressure in space 18 decreases, the piston 44 moves downwardly in the housing 20. Resultantly, a force on arm end 96 through the roller 116 causes it to move along the spirally extending channel 98 which in turn causes rotation of members 92 and 100.

In FIG. 3, a planar view of the under surface 64 of resistor board 64 is shown. The board has a resistor grid 124 thereon in a generally circular pattern. Engagement between the contact portions 106, 108 and the grid on surface 64 produces a desired variance in the resistive circuit including grid 124 and terminals 66 and 68.

Although a single embodiment of the invention has been shown in the drawings and described above, it should now be clear that the invention can be subject to modifications and still fall within the scope of the following claims.

We claim:

1. A pressure transducer, comprising: enclosure means having an apertured first end to admit pressurized fluid thereto; a flexible diaphragm member supported at its peripheral edge within the enclosure means and having a movable mid portion thereby dividing the enclosure into first and second interior spaces, one side of the mid portion being exposed to the pressurized fluid and an opposite side being exposed to atmospheric pressure; a piston member attached to the opposite side of the mid portion of the diaphragm and being movable therewith in an axial direction of the enclosure corresponding to changes in the fluid pressure but being prevented from rotating in the enclosure; the piston having a generally tubular portion substantially coaxially positioned in the enclosure; a helically extending channel means defining surfaces in the tubular portion; a follower and contact bearing assembly supported for rotation but prevented from any substantial axial movement in the enclosure, the assembly having a radially extending arm portion with an end cooperatively engaging the helical channel means whereby axially directed movements of the piston caused by changes in fluid pressure exert a force on the arm through the channel means causing the arm to move along the channel and thereby rotate in the enclosure; a roller follower means positioned between the arm position of the follower assembly and the surfaces of the tubular portion of the piston which define the helically extending channel therein.

2. A pressure transducer, comprising: a generally hollow base member having an apertured first end to admit a pressurized fluid therein; a generally hollow housing attached to the base member defining an interior space; a flexible diaphragm member supported at its peripheral edge between the base and housing members, the diaphragm having a movable mid portion separating the interior space from the pressurized fluid within the base member; a piston member in the interior space operatively connected to the mid portion of the diaphragm; means between the piston and the housing preventing rotation of the piston while permitting axial movements thereof corresponding to changes in fluid pressure; the piston having a tubular portion extending coaxially through the housing, a helically extending channel means formed in the tubular wall portion of the piston; an elongated support member attached to the housing and extending axially through the housing interior and the tubular portion; a follower member having an apertured central portion, the elongated support member extending through the apertured central portion permitting the follower member to rotate thereabout; the follower member further having a radially extending arm which operatively interacts with the helical channel of the encircling tubular portion whereby the arm is moved in the circumferential direction and the follower is rotated as the tubular portion moves axially in the housing; a roller follower means positioned between the radially extending arm of the follower member and the surfaces of the piston's tubular portion which define the helically extending channel therein; a contact bearing assembly rotatively supported about the elongated support member adjacent the follower member; means connecting the contact bearing assembly and the follower member so that they rotate together; and electrical circuit board having a resistor grid with a generally circular pattern thereon positioned in the interior space by the housing member whereby a sliding contact between the contact bearing assembly and the board is produced by relative rotation therebetween.

* * * * *